(12) United States Patent
Coulson et al.

(10) Patent No.: US 9,465,631 B2
(45) Date of Patent: Oct. 11, 2016

(54) AUTOMATIC CACHING OF PARTIAL RESULTS WHILE EDITING SOFTWARE

(75) Inventors: Michael Coulson, Clyde Hill, WA (US); Gregory Hughes, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 527 days.

(21) Appl. No.: 13/293,145

(22) Filed: Nov. 10, 2011

(65) Prior Publication Data

US 2013/0086327 A1 Apr. 4, 2013

Related U.S. Application Data

(60) Provisional application No. 61/542,087, filed on Sep. 30, 2011.

(51) Int. Cl.
*G06F 9/45* (2006.01)
*G06F 9/455* (2006.01)
*G06F 11/36* (2006.01)

(52) U.S. Cl.
CPC ......... *G06F 9/45516* (2013.01); *G06F 8/4442* (2013.01); *G06F 11/362* (2013.01)

(58) Field of Classification Search
CPC ................ G06F 17/30902; G06F 17/241; G06F 11/1464; G06F 11/3644; G06F 9/45516; G06F 8/45
USPC ......... 717/119, 114; 711/113–114, 119, 129; 707/201, 781
See application file for complete search history.

(56) References Cited

U.S. PATENT DOCUMENTS

| 5,774,685 | A | 6/1998 | Dubey |
| 6,427,234 | B1 * | 7/2002 | Chambers et al. ........... 717/140 |
| 8,443,348 | B2 * | 5/2013 | McGuire ................... G06F 8/45 312/200 |
| 2003/0188016 | A1 | 10/2003 | Agarwalla et al. |
| 2006/0190924 | A1 * | 8/2006 | Bruening et al. ............. 717/104 |

(Continued)

OTHER PUBLICATIONS

Liu, et al., "Static Caching for Incremental Computation", Retrieved at <<http://citeseerx.ist.psu.edu/viewdoc/download?doi=10.1.1.54.2607&rep=rep1&type=pdf>>, ACM Transactions on Programming Languages and Systems (TOPLAS), May 1998, vol. 20, No. 3, pp. 546-585.

(Continued)

*Primary Examiner* — Tuan Vu
(74) *Attorney, Agent, or Firm* — Nicholas Chen; Kate Drakos; Micky Minhas

(57) ABSTRACT

An automatic caching system is described herein that automatically determines user-relevant points at which to incrementally cache expensive to obtain data, resulting in faster computation of dependent results. The system can intelligently choose between caching data locally and pushing computation to a remote location collocated with the data, resulting in faster computation of results. The automatic caching system uses stable keys to uniquely refer to programmatic identifiers. The system annotates programs before execution with additional code that utilizes the keys to associate and cache intermediate programmatic results. The system can maintain the cache in a separate process or even on a separate machine to allow cached results to outlive program execution and allow subsequent execution to utilize previously computed results. Cost estimations are performed in order to choose whether utilizing cached values or remote execution would result in a faster computation of a result.

18 Claims, 6 Drawing Sheets

(56) References Cited

U.S. PATENT DOCUMENTS

| | | | | |
|---|---|---|---|---|
| 2006/0248124 | A1* | 11/2006 | Petev et al. | 707/201 |
| 2007/0180439 | A1* | 8/2007 | Sundararajan et al. | 717/158 |
| 2007/0294666 | A1* | 12/2007 | Papakipos et al. | 717/119 |
| 2009/0013128 | A1* | 1/2009 | Peterson | 711/113 |
| 2009/0307430 | A1* | 12/2009 | Bruening et al. | 711/119 |
| 2009/0313436 | A1* | 12/2009 | Krishnaprasad et al. | 711/129 |
| 2010/0125602 | A1* | 5/2010 | Eisinger et al. | 707/781 |
| 2010/0199042 | A1* | 8/2010 | Bates et al. | 711/114 |

OTHER PUBLICATIONS

Liu, et al., "Caching Intermediate Results for Program Improvement", Retrieved at <<http://citeseerx.ist.psu.edu/viewdoc/download?doi=10.1.1.90.978&rep=rep1&type=pdf>>, ACM SIGPLAN symposium on Partial evaluation and semantics-based program manipulation, Jun. 21-23, 1995, pp. 1-12.

Richardson, Stephen E., "Caching Function Results: Faster Arithmetic by Avoiding Unnecessary Computation", Retrieved at <<https://labs.oracle.com/techrep/1992/smli_tr-92-1.pdf>>, Sep. 1992, pp. 1-20.

Carlisle, et al., "Software Caching and Computation Migration in Olden", Retrieved at <<http://citeseerx.ist.psu.edu/viewdoc/download?doi=10.1.1.35.1964&rep=rep1&type=pdf>>, Proceedings of the fifth ACM SIGPLAN symposium on Principles and practice of parallel programming (PPOPP), Aug. 1995, pp. 1-14.

Steenput, Eli, "Caching of Intermediate Results in Dataflow Environments", Retrieved at <<http://wwwir.vub.ac.be/elec/Papers%20on%20web/Papers/EliSteenput/Thesis.pdf>>, Aug. 1999, pp. 196.

* cited by examiner

AUTOMATIC CACHING OF PARTIAL RESULTS WHILE EDITING SOFTWARE

CROSS-REFERENCE TO RELATED APPLICATIONS

The present application claims priority to U.S. Provisional Patent Application No. 61/542,087 entitled "AUTOMATIC CACHING OF PARTIAL RESULTS WHILE EDITING SOFTWARE", and filed on 2011 Sep. 30, which is hereby incorporated by reference.

BACKGROUND

Editing and debugging software program code is the process of writing and modifying instructions in a programming language, such as C++, C#, VB.NET, and other languages. Some programming environments even provide building blocks for programs that are visual in nature such that the program author may not be aware of or directly interact with an underlying programming language. Editing and debugging is often time consuming, as it involves running a software program many times, inspecting the results up to a particular point for errors, solving any errors by modifying the program code, and running the program again. Software testing seeks to subject a software program to real world usage conditions to find potential errors in the software program so the errors can be corrected before delivering the program to customers.

Development environments, such as the MICROSOFT™ VISUAL STUDIO™ development environment, provide many features for building, testing, and debugging software programs. One feature of modern development environments is "edit and continue" which allows a software developer to modify software code directly in a debugger and have those modifications reflected during the debugging session. Behind the scenes the development environment may make the received change, recompile the program code, and re-run the program up to the point of the previous execution. Repeated execution may entail recomputing previously determined results.

Caching seeks to save results of computations on data so that future requests for the results can be satisfied from a cache rather than through repeated computation of the results. Caching can occur at many levels, including inside computer processors (e.g., L1 and L2 cache), within computer system memory, in networking hardware (e.g., a buffer in a network card or an Internet proxy), and so forth. Caching is often difficult because to be effective it is often useful for the software developer to be involved in choosing what, when, and where to cache data.

Complex programs are often written by breaking a problem down into a series of simple steps that can be more easily authored, verified, and reasoned about. The downside to such an approach is that typically in order to compute step N+1, steps 1 through N are recomputed, resulting in longer computation with the addition of each step. Programming languages often include mechanisms that can be used to cache results in order to improve performance, but these caches are typically required to be explicit, and typically do not cross execution boundaries. For example, a function written in C# or the JAVA™ programming language that reads data from a database will typically read the same data from the database upon every invocation of the function unless the program takes explicit steps to cache the data. Additionally, repeated executions of such a program will read the same data from the database, unless the program has taken explicit steps to cache the data outside of the memory of the program.

Many language environments typically involve a translation from source code to executable code, which usually implies that edits or changes to the source code demand the executable code to be regenerated, which in turn means that the program is restarted after the changes. In such environments and in the absence of explicit caching, previous computation is lost and is recomputed. For example, consider a C++ program that reads a large file of numbers and computes the sum. In order to have the program also compute the average, the source program will be modified and recompiled. Then, the program restarts and the file is read into memory again. Depending on the size of the data, this can introduce substantial delays into the process of authoring program code, and can create a substantial performance hit to resources such as processors, networking hardware, databases, and so forth.

SUMMARY

An automatic caching system is described herein that automatically determines user-relevant points at which to incrementally cache expensive to obtain data, resulting in faster computation of dependent results. The system can intelligently choose between caching data locally and pushing computation to a remote location collocated with the data, resulting in faster computation of results. In some embodiments, the automatic caching system uses stable keys to uniquely refer to programmatic identifiers (e.g., locations within the program code). The system annotates programs before execution with additional code that utilizes the keys to associate and cache intermediate programmatic results. The system can maintain the cache in a separate process or even on a separate machine. These results outlive program execution allowing subsequent execution to utilize previously computed results. Cached results are discarded when subsequent program executions determine the results are stale. Stale results are determined by tracking changes to programmatic identifiers and their dependencies. Cost estimations are performed in order to choose whether utilizing cached values or remote execution would result in a faster computation of a result. Thus, the automatic caching system allows for faster authoring and modification of program code by shortening or eliminating the redundancy of recomputing already available results.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 4 is a display diagram that illustrates a user interface displayed in association with the automatic caching system to visually edit a software program for accessing data, in one embodiment.

FIG. 5 is a display diagram that illustrates a user interface displayed in association with the automatic caching system to view the software code behind a visually produced program, in one embodiment.

DETAILED DESCRIPTION

An automatic caching system is described herein that automatically determines user-relevant points at which to incrementally cache expensive to obtain data, resulting in faster computation of dependent results. The system can intelligently choose between caching data locally and pushing computation to a remote location collocated with the data, resulting in faster computation of results. In some embodiments, the automatic caching system uses stable keys to uniquely refer to programmatic identifiers (e.g., locations within the program code). The system annotates programs before execution with additional code that utilizes the keys to associate and cache intermediate programmatic results. The system can maintain the cache in a separate process or even on a separate machine. These results outlive program execution allowing subsequent execution to utilize previously computed results. Cached results are discarded when subsequent program executions determine the results are stale. Stale results are determined by tracking changes to programmatic identifiers and their dependencies. Cost estimations are performed in order to choose whether utilizing cached values or remote execution would result in a faster computation of a result. Thus, the automatic caching system allows for faster authoring and modification of program code by shortening or eliminating the redundancy of recomputing already available results.

Figure 1:
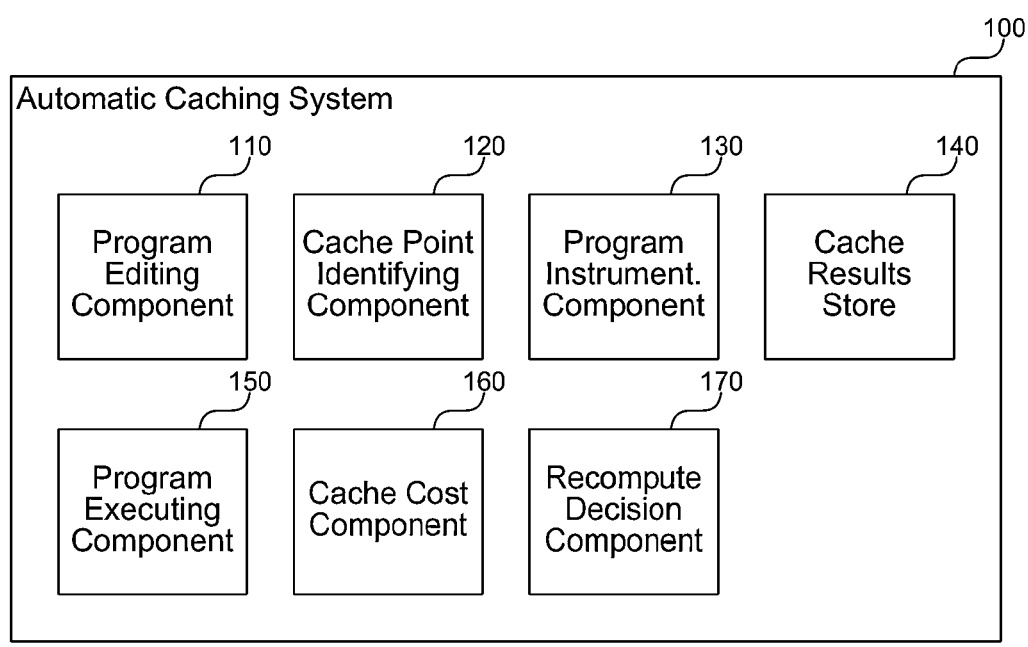
FIG. 1 is a block diagram that illustrates components of the automatic caching system, in one embodiment.

FIG. 1 is a block diagram that illustrates components of the automatic caching system, in one embodiment. The system 100 includes a program editing component 110, a cache point identifying component 120, a program instrumenting component 130, a cached results store 140, a program executing component 150, a cache cost component 160, and a recompute decision component 170. Each of these components is described in further detail herein.

The program editing component 110 provides an interface that receives software program actions from a software developer. The interface may include a graphical user interface, programmatic interface (e.g., invoked by other tools), console user interface (e.g., a scripting environment like WINDOWS™ POWERSHELL™), or other interface for receiving programming information. The program actions may include instructions in the form of keywords of a programming language, visual resources in a visual programming environment, or other forms of specifying what a program does. The software developer accesses the program editing component 110 to create, edit, and maintain the software program comprised of the specified software program actions. Although referred to herein as a software developer, the users of the system 100 may have varying levels of programming experience. In some cases, users may not know any programming language, but may put programs together using visual tools provided by the system 100.

The cache point identifying component 120 identifies one or more points among the received software program actions at which to cache programmatic results related to each point. For example, in a programming environment that allows users to assemble programs using visual building blocks that represent retrieving or analyzing data, the component 120 may identify each junction between blocks as being a suitable point for caching any output result provided by the prior block and consumed by the subsequent block. In other programming environments, the component 120 may use a variety of heuristics to automatically determine appropriate points to cache data, such as locations following computationally or network intensive data retrieval and/or processing. For example, if data is retrieved from a potentially high latency network resource or computations are performed by the program that are processor intensive, the component 120 may identify a point after such retrieval or computation as a good location to cache the result. The component 120 may also factor in other information, such as how likely the data is to change. For a purely mathematical calculation on static data, caching may be highly appropriate if the result is expensive to calculate and likely to be needed again.

The program instrumenting component 130 instruments the received software program actions to place additional caching actions at the identified cache points. Each cache action specifies a location to which to cache data calculated prior to the cache point, what data to cache (e.g., a variable, file, or memory region), where the data is currently stored (e.g., in a register, local variable, local data store, and so on), a cache key with which to associate the cached data so that future requests for the same data can refer to the data stored in the cache, and potentially a lifetime for the cached data (e.g., a time after which the data is stale can be removed from the cache). Instrumentation generally refers to inserting instructions in an existing program, but can occur in a variety of ways depending on the nature of the program. For example, C++ programs may be instrumented by inserting assembly instructions into a compiled binary executable file. For languages that produce intermediate language output (e.g., MICROSOFT™ Intermediate Language (MSIL) produced by MICROSOFT™ .NET languages), instrumenting may include inserting additional intermediate language instructions so that the existing process for converting from intermediate language to machine language will pick up the original and added instructions.

The cached results store 140 stores data that is cached for subsequent use by the instrumented software program actions. The cached results store 140 may include one or more memory regions, files, file systems, hard drives, databases, cloud-based storage services, or any other data storage facility for persisting data. In some embodiments, the cached results store 140 may leverage a data store that is available across processes and potentially even across computer systems so that multiple runs of software program during editing of the program can receive cached results that persist across multiple process sessions with the cache. The cached results store 140 may include an executable service or other program code for managing the cache, handling requests, removing stale cache data, and so forth.

In some embodiments, the cached results store 140 is distributed to multiple locations so that information can be cached at a location close to one or more sources of data as well as or in addition to caching at the location where the software program that uses the cache is being run. The cache may also become stale outside of the knowledge of the program, and the user may wish to obtain the most recent values (e.g., consider the caching of a web page). Thus, in some embodiments, the system provides a user-explicit way to discard the cache.

The program executing component 150 provides an execution environment for carrying out the software program actions. The execution environment may include operating system components, a language runtime, a virtual machine, or any other environment for running the program code. In some cases, the environment includes a debugger that manages the process of the running software program so that the program's data, progress, and status can be monitored. The execution environment may also include a development tool that provides "edit and continue" or other types of program editing support during debugging. During execution of an action that produces cacheable results, the program executing component 150 stores the results in the cached results store 140 using a cache key associated with the action. During execution at instrumented cache points before software actions that can leverage cached results, the program executing component 150 invokes the recompute decision component 170 to determine whether to recompute results or access the results from the cached results store 140. If the results are to be obtained from the cache, the program executing component 150 accesses the cached results and may skip any program actions that produce the results (e.g., during an earlier run). This skipping allows the program to execute much faster on subsequent runs that are able to leverage cached results.

The cache cost component 160 determines a cost of accessing cached data versus recomputing the data expected to be in the cache. The cache cost component 160 may factor in processing time, costs associated with accessing remote data (e.g., latency and bandwidth), burden on various resources (e.g., memory, network, processor, hard drives, and so on), ease of recomputing the data, and so forth to determine whether accessing the cache is better than recomputing the data. For far away data or computationally intensive operations to produce data, the cache may provide faster access to results.

The recompute decision component 170 receives cost information determined by the cache cost component 160 and selects the cache or recomputation as the source of data for a particular program action. The recompute decision component 170 may be configurable and/or use varying heuristics to address goals of particular applications or caching strategies. For example, for some environments the cost of caching may be so cheap compared to recomputation that caching is highly preferable. For other environments, recomputation may be efficient and cache storage scarce such that recomputation is more preferable in many cases. The system 100 may allow application developers, administrators, or others to tune how the cost decision is made to suit their particular program goals.

The computing device on which the automatic caching system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored on computer-readable storage media. Any computer-readable media claimed herein include only those media falling within statutorily patentable categories. The system may also include one or more communication links over which data can be transmitted. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
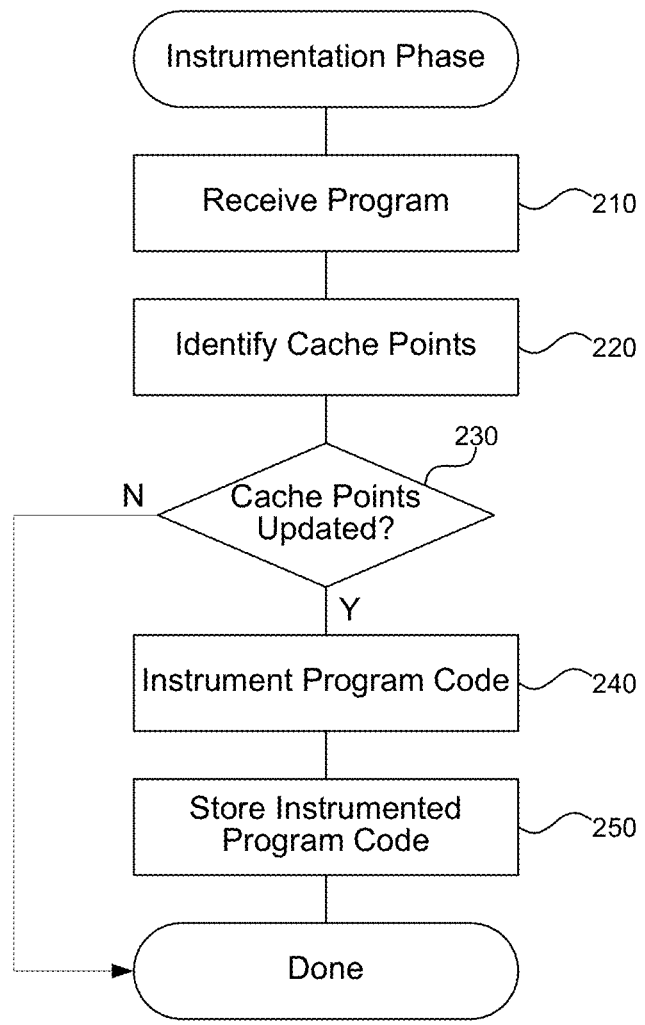
FIG. 2 is a flow diagram that illustrates processing of the automatic caching system to instrument a software program with automatic caching of results, in one embodiment.

FIG. 2 is a flow diagram that illustrates processing of the automatic caching system to instrument a software program with automatic caching of results, in one embodiment. Beginning in block 210, the system receives a software program that has been edited by an editing user. The system may receive the program through a development tool, during an editing session or build process of the tool. The system may operate as the user edits the program or after the user stores a new version of the program. The system may operate in coordination with a development environment or as a secondary build process.

Continuing in block 220, the system automatically identifies one or more cache points between instructions of the received software program that indicate one or more locations where data has been gathered or computed and can be cached to avoid at least one subsequent gathering or computation of the same data. The system may identify cache points based on particular program instructions or data sources. In some embodiments, the system includes a visual environment for building the software program by selecting visual program building blocks, and the system identifies the point following each block as a point to cache data created or output by the block.

Continuing in decision block 230, if the system identified a new cache point, then the system continues to block 240, else these steps conclude. The system may operate repeatedly on the same program as the user edits the program over time. As the user adds new program code the system checks to determine whether new cache points exist and reinstruments the software program to add caching code at identified locations. The system may also remove previous cache points as the user removes program code through editing.

Continuing in block 240, the system instruments the received software program to add caching logic that checks for and stores cached data at identified cache points. Instrumentation adds logic before a block of code executes that determines whether a cached version of the data generated by the block is available so that the block can be bypassed by using the cached data. Instrumentation also adds logic at the end of a block of code that stores output of the block of code to the cache for use during subsequent potential runs of the block of code. Instrumentation adds instructions in a manner suitable for the particular programming language and environment of the software program. For example, the system may have access to an intermediate language version of the program that can be instrumented by adding additional intermediate language instructions before the program is compiled.

The instrumentation associates cached data at each location with a cache key that acts as an identifier for distinguishing cached data associated with one point in the program from cached data associated with other points from the same or other programs. By using the same key over time for a particular cache point, the system can cause data to be cached across execution boundaries and across changes to the program code. Conversely, if program code changes significantly the system can also ensure that cached data is invalidated by changing cache keys or by inserting instrumentation that indicates that previously cached data is invalid.

Continuing in block 250, the system stores the instrumented program code for execution upon invocation of the software program. The system may store the code by creating a binary module or other runtime module that represents the software program. The system may also execute the software program. In cases where the user is actively editing the software program in a development environment, the system may repeatedly modify, instrument, store, and execute the software program during an editing session as the user improves the software program. After block 250, these steps conclude.

Figure 3:
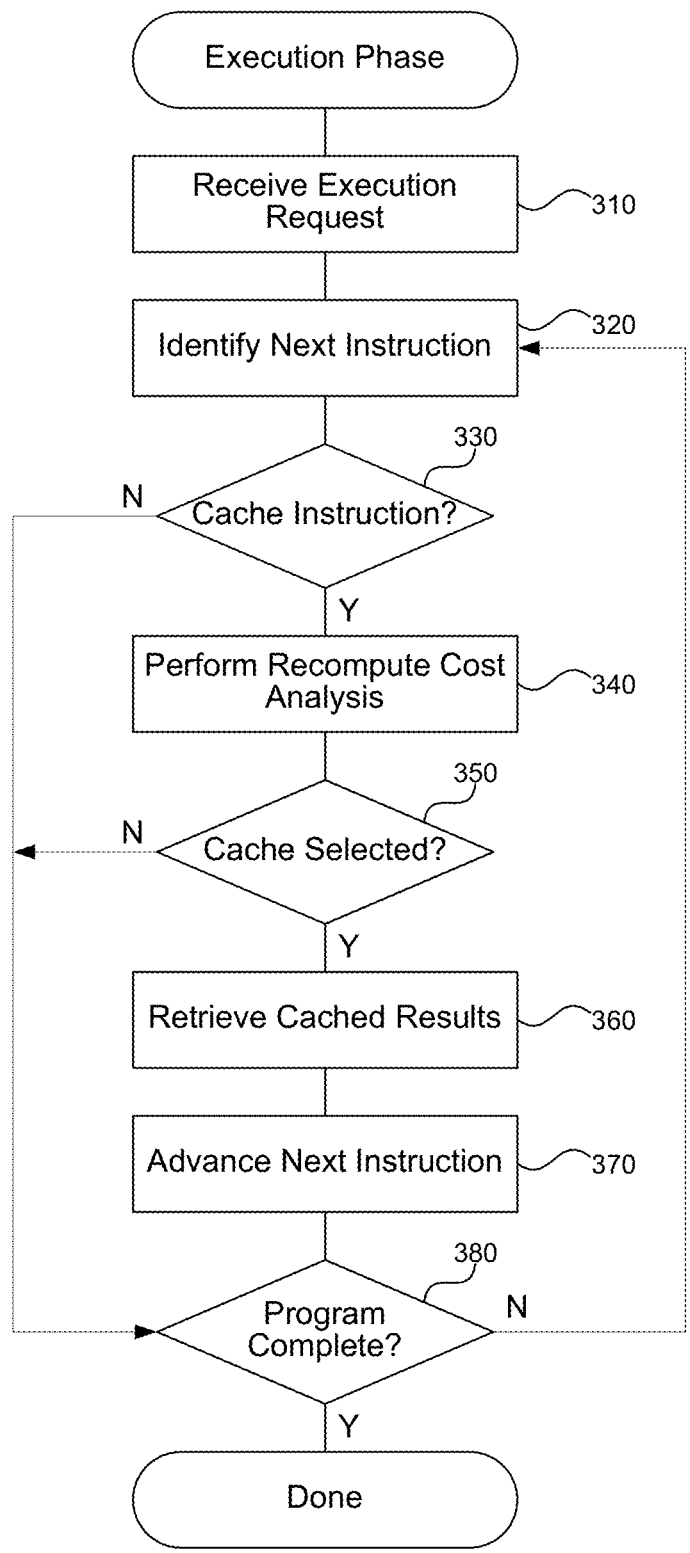
FIG. 3 is a flow diagram that illustrates processing of the automatic caching system to execute a software program previously instrumented to automatically cache results, in one embodiment.

FIG. 3 is a flow diagram that illustrates processing of the automatic caching system to execute a software program previously instrumented to automatically cache results, in one embodiment. Beginning in block 310, the system receives a request to execute a software program previously instrumented to automatically cache data at identified points within the program. The execution request may be received in a development environment that a program author is using to edit or test the software program or from an operating system that provides a shell for executing software programs directly. The execution request may identify a binary or other module associated with the software program.

Continuing in block 320, the system identifies a next instruction of the software program to execute. Depending on the type of software program, the manner of storing the current location of the program may vary. For example, for software programs that are stored as machine executable assembly code, the processor typically maintains a program counter that identifies a memory location of the next software instruction. For runtime-based or virtual environments, the runtime or virtual machine may manage a similar program counter at the software level that indicates which instruction or block of the program is next to execute.

Continuing in decision block 330, if the system identifies the next instruction as a cache instruction, then the system continues at block 340, else the system executes the instruction and continues to block 380. A cache instruction is an instrumented point in the program code where the system either may use previously cached results to skip a block of code, or may execute the block of code to produce a result that can then be cached and used to bypass subsequent execution of the block of code.

Continuing in block 340, the system performs a cost analysis that weighs a cost associated with accessing cached data against a cost associated with computing the data without using the cache. In some cases, accessing the cache may involve pulling large amounts of data across a network connection consuming bandwidth, incurring long latency, or burdening a remote server to provide the data. In other cases, recomputing the data may burden resources locally or remotely and using cached data may be preferable. The cost analysis weighs these factors and decides where to obtain the data based on a decision function. The decision function may be configurable and take into account goals of any particular implementation of the system that affect the outcome of the decision between cached and recomputed data.

Continuing in decision block 350, if the system selects accessing cached data, then the system continues at block 360, else the system ignores the cache and continues to block 380 to execute the next instructions that will recompute the data (or compute it for the first time if it is the first time the software program has run).

Continuing in block 360, the system retrieves cached data associated with the cache point of the identified next instruction. The system may associate cached results with a cache key that identifies a point within the software program that produces particular results stored in the cache. The results may be cached on the same machine where the software program is running or remotely, such as through a cloud-based storage service. This allows results to survive executions of the software program and may allow cached data to be collocated with a location (e.g., a database) where the data is produced.

Continuing in block 370, the system advances the next instruction to be executed of the software program beyond any instructions that can be skipped due to use of the cached data. One purpose of the cached data is to eliminate the need to re-run all of the previous steps of the program. Thus, accessing cached data implies that at least some portions of the software program can be skipped in favor of using the cached data. The skipped portion may include a single instruction that retrieves data from a data source (e.g., reading numbers from a file) or many instructions that perform a long computation.

Continuing in decision block 380, if the software program has reached the end, then these steps conclude, else the system loops to block 320 to identify the next instruction. The system executes the software program until the program exits or until the user interrupts execution (not shown) to edit the program further and re-run the program. After block 380, these steps conclude.

In some embodiments, the automatic caching system operates in conjunction with a data mashup service and language for knowledge workers, like those familiar with MICROSOFT™ EXCEL™. These users often need to gather data from a variety of sources, perform some analysis on the data, and potentially perform additional analysis on or display the results. In some embodiments, the system provides a user interface through which users can define steps and analysis to occur with data by visually combining resources that represent data sources, operations, filters, and so forth. The following figures illustrate an example user interface using one embodiment.

Figure 4:
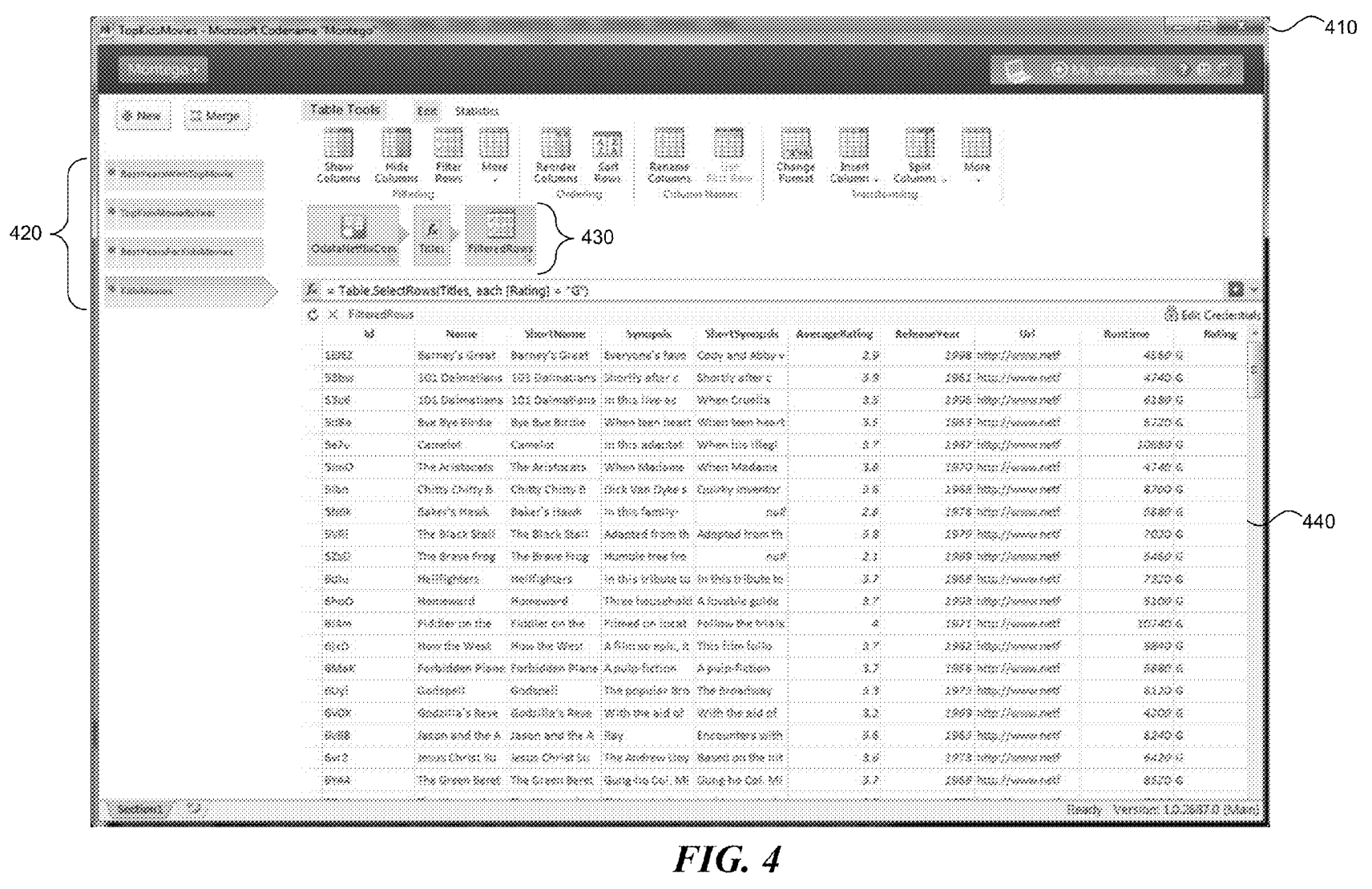

FIG. 4 is a display diagram that illustrates a user interface displayed in association with the automatic caching system to visually edit a software program for accessing data, in one embodiment. The diagram includes a program window 410 that includes a list of resources 420 that the software author can access to build the software program. The resources may include data sources, common data operations, custom data operations, and so forth. A chain of actions 430 shows the set of resources that the author has selected so far and how they are connected. In the illustrated example, the actions first grab data from Netflix.com, then perform a function to extract movie titles, and then filter movies to find kids movies that have a G-rating. The table 440 shows the output data produced by executing the chain of actions 430. The user is visually building a software program. Although the user does not provide any program code, the development environment converts the user's chain of actions 430 into appropriate software instructions to accomplish the user's task.

Figure 5:
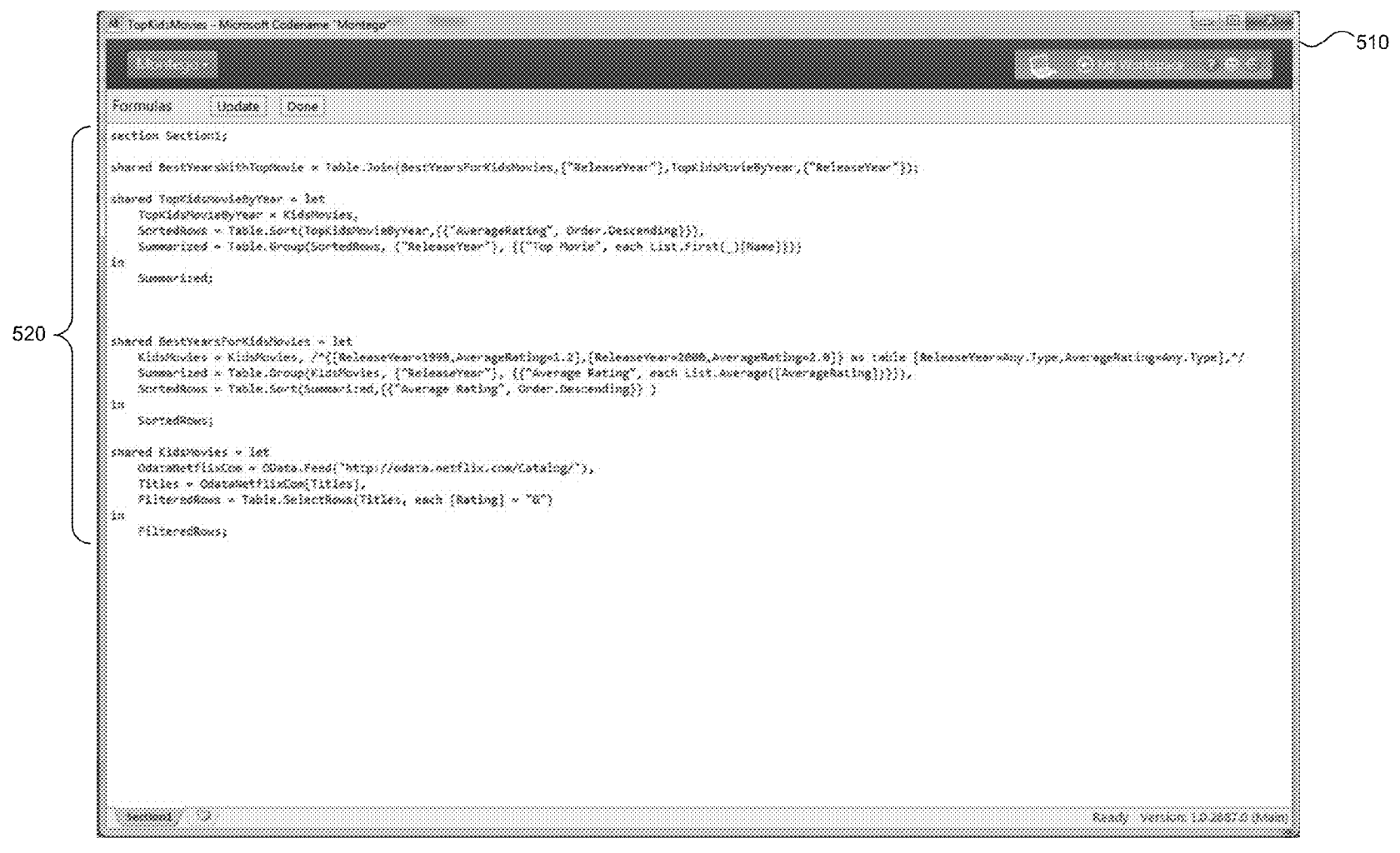

FIG. 5 is a display diagram that illustrates a user interface displayed in association with the automatic caching system to view the software code behind a visually produced program, in one embodiment. The diagram includes a program window 510 that provides another view of the program being built in FIG. 4. In FIG. 5, the editing environment shows the software code 520 underlying the chain of actions provided in FIG. 4. The software code 520 includes instructions for accessing data from a web based data source (e.g., Netflix), extracting a subset of the data, and filtering rows of data.

Figure 6:
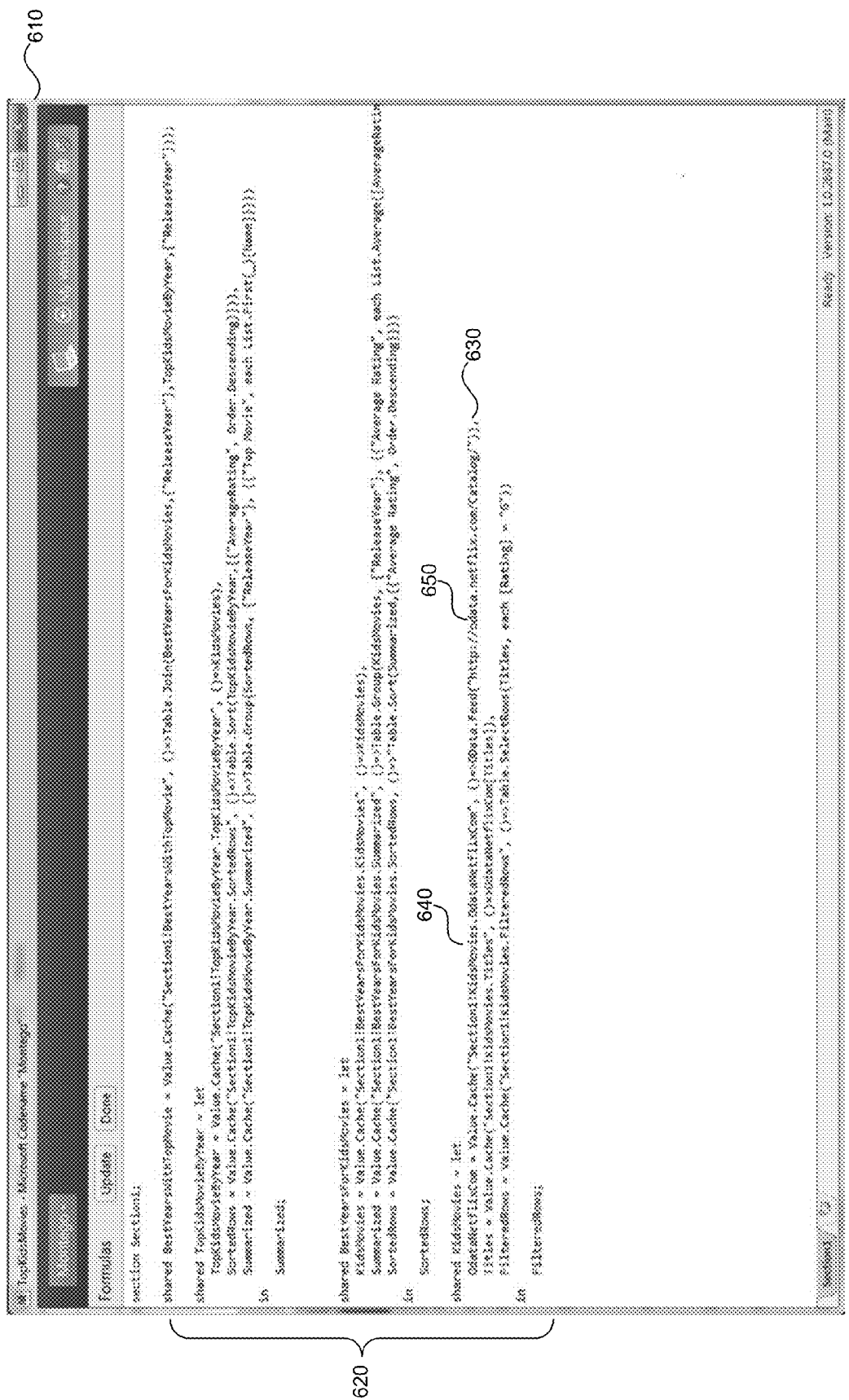
FIG. 6 is a display diagram that illustrates a user interface displayed in association with the automatic caching system to view instrumented software code, in one embodiment.

FIG. 6 is a display diagram that illustrates a user interface displayed in association with the automatic caching system to view instrumented software code, in one embodiment. The diagram includes a program window 610 similar to that of FIG. 5, but this time the code is instrumented with caching instructions. The program window 610 shows the program code 620 underlying the chain of actions provided in FIG. 4. The automatic caching system has instrumented the program code 620, so that appropriate instructions store and use cached versions of data. For example, instrumented line 630 contains a call to a function Value.Cache that receives a first parameter 640 that is a cache key and a second parameter 650 that is the data to cache. Upon reaching the instrumented line 630, the function Value-.Cache determines whether to retrieve the requested data from the cache or to recompute the data. In either cache, the result is placed in the local variable OdataNetflixCom in this case.

In some embodiments, the automatic caching system operates in conjunction with a lazy retrieval mechanism of a programming environment. Some programming languages or platforms may avoid retrieving data until the data is being used. For example, if a software instruction requests retrieving 1,000 records but a user interface is only displaying 100 of the records, then the platform may only retrieve the first 100 records until the user scrolls or takes some other action to see more records. In such environments, the caching system is aware of the lazy retrieval, and caches as much data as has been retrieved with an indication that the data is only a portion of the total available data. In the previous example, the system would cache the 100 retrieved records and behave in the same manner as the system without caching would. In other words, upon a request to display the 100 records, the system would retrieve the records from the cache and display them, and upon a request to scroll more records into view, the system would retrieve them from the data source (and cache them for future requests).

In some embodiments, the automatic caching system operates with programs built through a web-based interface. The program environment may provide a web application through which authors can create software programs. In such cases, a browser is running at the author's client computer, but the authors program is running remotely at a web server or some other remote server (e.g., a cloud computing resource). The system may select where to cache data based on this situation. For example, the system may elect to cache data at the web server, at a data server, and so forth.

In some embodiments, the automatic caching system automatically identifies differences in changed software programs to instrument the programs in a consistent manner. For example, the system may receive a new program definition, run a diff on the definition and a previous definition from the same program, and determine where to place cache points and what cache keys to use on this basis. In some cases, the system determines data dependencies in the received program and updates the cache based on any changed program code to invalidate any stale cache data. For example, a program author's changes may make some previously cached elements invalid, and the system identifies those elements and marks them for removal from the cache.

In some embodiments, the automatic caching system includes handling for data joins that takes into consideration costs associated with performing joins locally versus remotely. Joins are often computationally expensive. In many cases, it may be desirable to push join processing (possibly including transmission of some previously computed or cached data) to a remote database server rather than retrieving data records from one or more sources and joining them locally to identify relevant records. The system may include cache rules based on joins, such as ignoring the cache when accessing remotely joined data. The system includes a cost-based optimizer that decides whether to access remote data and thus ignore the cache, or to use cached data. For joins that include sub-expressions that are complex, the system may opt to cache the result of the join but avoid caching the sub expressions.

In some embodiments, the automatic caching system determines how much data to cache. In cases where the cache is located on a separate machine from the program execution, the system can be less vigilant about affecting the program. For example, the system may dedicate all memory to caching and simply cache until an out of memory error is received. The system can try accessing data from the cache and if this results in the cache running out of memory then the system can try again without caching (i.e., recomputing the data). In other cases, the system may assign a fixed memory size to the cache and manage the cache to stay within the fixed memory size (e.g., by discarding stale data as new data is received).

In some embodiments, the automatic caching system creates additional cache points based on different execution strategies. For example, consider the following example.

```
let table1 = SQLDatabase("Server1", "CustomerData")[Customers],
    table2 = OData.Feed("http://server2/OrderData.svc")[Orders],
    join = Table.Join (table1, table2, (row1, row2) => row1[CustomerId
= row2[CustomerId])
...
let SeniorDiscountCustomers = Table.SelectRows(join, each [Age] >= 55)
```

Note that during an execution of the program located at the final instruction, an optimizer may observe that retrieving all of the data suggested by the previous instructions can be avoided, and since only a part of the data is used, only that data can be retrieved to save resources. In the case of the above example, the optimizer might recognize that only the customers above a certain age need to be considered when performing the join and thus it could restrict tablet by age before executing the join. When such a subset of data is retrieved, the system may also elect to cache that subset of data. However, if the program changes and more of the data is used, it is useful for the system to understand what the new program needs versus what is in the cache. Thus, the system may use cache keys that differentiate the data (e.g., "Section1.Table1" vs. "Section1.Table1+FilteredBy- AgeGe55"). The system can also use this alternative cached data in further expressions. At any given point of execution, the optimizer can choose which set of cached data makes the appropriate tradeoff between resource utilization and cache access.

From the foregoing, it will be appreciated that specific embodiments of the automatic caching system have been described herein for purposes of illustration, but that various modifications may be made without deviating from the spirit and scope of the invention. Accordingly, the invention is not limited except as by the appended claims.

We claim:

1. A computer-implemented method to instrument a software program with automatic caching of results, the method comprising:
   at a cache point identifying component executed by a processor, receiving a software program including a chain of actions that have been written by an editing user;
   automatically identifying and inserting a cache point between actions in the chain of actions in the software program,
   the cache point indicating a location where data that has been gathered or computed can be cached to avoid subsequent gathering or computation of the same data, where the cache point has not been previously identified as a potential cache point and the cache point is configured to persist across a series of execution phases;
   at a program instrumenting component executed by the processor, instrumenting the software program to add caching logic that checks for and stores cached data at the location indicated by the cache point;
   storing the instrumented software program with the caching logic at the cache point in memory associated with the processor;
   at a program executing component executed by the processor, during a first execution phase, executing the instrumented software program in the virtual machine, wherein the execution of the instrumented software program includes:
      compiling the instrumented software program; and
      running a plurality of actions in the chain of actions, wherein a particular action in the plurality of actions includes caching data based on the caching logic in a cache results store;
   receiving an edit of the instrumented software program, the edit generated responsive to user input; and
   executing the edited software program during a second execution phase;
   wherein the execution of the edited software program includes:
      recompiling the edited software program;
      rerunning a portion of the plurality of actions in the edited software program;
      determining that the cached data corresponding to the particular action is to be retrieved from the cache results store rather than recomputed;
      in response to determining that the cached data is to be retrieved, skipping the particular action corresponding to the cached data in the plurality of actions and retrieving the cached data while rerunning the remainder of the plurality of actions.

2. The method of claim 1 wherein receiving the software program includes receiving the program through a development tool during an editing session or build process of the tool.

3. The method of claim 1 wherein automatically identifying and inserting the cache point includes, in association with a visual environment for building the software program by selecting a visual program building block, identifying a point following the block as a point to cache data created or output by the block.

4. The method of claim 1 wherein automatically identifying and inserting the cache point includes identifying a point after which computation beyond a threshold resource usage has occurred.

5. The method of claim 1 wherein automatically identifying and inserting the cache point are implemented repeatedly on the software program as the user edits the program over time.

6. The method of claim 1 wherein automatically identifying and inserting the cache point includes selecting a cache key to distinguish the identified cache point.

7. The method of claim 1 wherein instrumenting the software program includes adding logic before a block of code executes that determines whether a cached version of the data generated by the block is available so that the block can be bypassed by using the cached data.

8. The method of claim 1 wherein instrumenting the software program includes adding logic at the end of a block of code that stores output of the block of code to the cache for use during subsequent potential runs of the block of code.

9. The method of claim 1 wherein instrumenting the software program includes accessing an intermediate language version of the program which can be instrumented by adding additional intermediate language instructions before the program is compiled.

10. The method of claim 1 wherein instrumenting the software program includes associating cached data at the location with a cache key that acts as an identifier for distinguishing cached data associated with one point in the program from cached data associated with other points from the same or other programs.

11. The method of claim 1 wherein instrumenting the software program includes, after receiving changed program code, identifying data dependencies and invalidating cached data rendered invalid based on the received changes.

12. The method of claim 1 wherein storing the instrumented software program includes storing the instrumented software program by creating a binary module or other runtime module that represents the software program.

13. A computer system for automatic caching of partial results while editing software, the system comprising:
   a processor and associated memory;
   a cache point identifying component executed by the processor to:
      receive a software program including a chain of actions that have been written by an editing user;
      automatically identify and insert a cache point between actions in the chain of actions in the software program, the cache point indicating a location where data that has been gathered or computed can be cached to avoid subsequent gathering or computation of the same data where the cache point has not been previously identified as a potential cache point and the cache point is configured to persist across a series of execution phases;
   a program instrumenting component executed by the processor to:
      instrument the software program to add caching logic that checks for and stores cached data at the location indicated by the cache point;

store the instrumented software program with the caching logic at the cache point in the memory;
a program executing component executed by the processor to:
during a first execution phase, execute the instrumented software program in the virtual machine,
wherein the execution of the instrumented software program includes:
compiling the instrumented software program; and
running a plurality of actions in the chain of actions, wherein a particular action in the plurality of actions includes caching data based on the caching logic in a cache results store;
receive an edit of the instrumented software program, the edit generated responsive to user input; and
execute the edited software program during a second execution phase;
wherein the execution of the edited software program includes:
recompiling the edited software program;
rerunning a portion of the plurality of actions in the edited software program;
determining that the cached data corresponding to the particular action is to be retrieved from the cache results store rather than recomputed;
in response to determining that the cached data is to be retrieved, skipping the particular action corresponding to the cached data in the plurality of actions and retrieving the cached data while rerunning the remainder of the plurality of actions.

14. The system of claim 13 wherein the program editing component includes a visual programming environment in which a program author selects one or more program resources and connects the resources together to build a software program.

15. The system of claim 13 wherein the cache point identifying component is configured to identify each junction between blocks in a programming environment that allows users to assemble programs using visual building blocks that represent retrieving or analyzing data as being a suitable point for caching any output result provided by the prior block and consumed by the subsequent block.

16. The system of claim 13 wherein the program instrumenting component is configured to create cache actions that specify a cache key with which to associate the cached data so that future requests for the same data can refer to the data stored in the cache.

17. The system of claim 13 wherein the cached results store is configured to store data across execution sessions of the software program.

18. The system of claim 13 wherein the cached results store is configured to store the cached data on a computer system remote from the computer system executing the software program.

* * * * *